US012712320B2

(12) United States Patent
Xue

(10) Patent No.: US 12,712,320 B2
(45) Date of Patent: Aug. 18, 2026

(54) CONNECTOR MALE HEAD AND CONNECTOR FEMALE HEAD

(71) Applicant: BEIJING UNICORN TECHNOLOGY CO., LTD., Beijing (CN)

(72) Inventor: Jinbo Xue, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 355 days.

(21) Appl. No.: 18/691,891

(22) PCT Filed: Sep. 16, 2022

(86) PCT No.: PCT/CN2022/119293

§ 371 (c)(1),
(2) Date: Mar. 14, 2024

(87) PCT Pub. No.: WO2023/041031

PCT Pub. Date: Mar. 23, 2023

(65) Prior Publication Data

US 2025/0132526 A1 Apr. 24, 2025

(30) Foreign Application Priority Data

Sep. 16, 2021 (CN) ......................... 202111086629.9

(51) Int. Cl.
*H01R 13/64* (2006.01)
*H01R 13/24* (2006.01)
(Continued)

(52) U.S. Cl.
CPC ..... *H01R 13/6461* (2013.01); *H01R 13/2471* (2013.01); *H01R 13/504* (2013.01);
(Continued)

(58) Field of Classification Search
CPC ........................ H01R 13/6461; H01R 13/2471
See application file for complete search history.

(56) References Cited

U.S. PATENT DOCUMENTS 6,908,340 B1 6/2005 Shafer
9,653,859 B1 * 5/2017 Moore .................. H01R 13/41
2014/0364006 A1 12/2014 Lo et al.

FOREIGN PATENT DOCUMENTS

CN 2600951 Y 1/2004
CN 1586026 A 2/2005
(Continued)

OTHER PUBLICATIONS

ISR received in PCT/CN2022/119293; mailed Nov. 28, 2022.
(Continued)

*Primary Examiner* — Phuong K Dinh
(74) *Attorney, Agent, or Firm* — K&L Gates LLP

(57) ABSTRACT

The present disclosure provides a connector male head and a connector female head. The connector male head comprises a plurality of first transceiving terminals including a plurality of first data terminals arranged in a first column; a plurality of second transceiving terminals including a plurality of first data terminals arranged in a second column, the first column being parallel to the second column; a plurality of first power terminals and a plurality of first signal terminals; a plurality of second power terminals and a plurality of second signal terminals; and an anti-crosstalk protrusion located between the first data terminals of the first transceiving terminals and the first data terminals of the second transceiving terminals to reduce crosstalk between the first data terminals of the first transceiving terminals and the first data terminals of the second transceiving terminals.

20 Claims, 4 Drawing Sheets

(51) Int. Cl.

| | |
|---|---|
| ***H01R 13/504*** | (2006.01) |
| ***H01R 13/62*** | (2006.01) |
| ***H01R 13/6461*** | (2011.01) |
| ***H01R 13/6582*** | (2011.01) |
| ***H01R 24/28*** | (2011.01) |

(52) U.S. Cl.

CPC ..... *H01R 13/6205* (2013.01); *H01R 13/6582* (2013.01); *H01R 24/28* (2013.01)

(56) References Cited

FOREIGN PATENT DOCUMENTS

| | | | |
|---|---|---|---|
| CN | 1797864 | A | 7/2006 |
| CN | 105261892 | A | 1/2016 |
| CN | 206401645 | U | 8/2017 |
| CN | 107681371 | A | 2/2018 |
| CN | 109428192 | A | 3/2019 |
| CN | 110504594 | A | 11/2019 |
| CN | 211351162 | U | 8/2020 |
| CN | 211530332 | U | 9/2020 |
| CN | 214204122 | U | 9/2021 |
| CN | 113783040 | A | 12/2021 |
| CN | 216055541 | U | 3/2022 |
| JP | 2015109291 | A | 6/2015 |

OTHER PUBLICATIONS

The first office action received in the counterpart CN application 202111086629.9, dated May 22, 2025, 14 pages with English translation.

* cited by examiner

CONNECTOR MALE HEAD AND CONNECTOR FEMALE HEAD

CROSS-REFERENCES TO RELATED APPLICATIONS

The present disclosure is a national phase application of International Application No. PCT/CN2022/119293, filed on Sep. 16, 2022, which claims priority of the Chinese patent application No. 202111086629.9 filed with the Chinese Patent Office on Sep. 16, 2021, the entireties of which are herein incorporated by reference.

FIELD

The present disclosure relates to the field of data transmission, in particular to a connector male head and a connector female head.

BACKGROUND

Data transmission is widely used in various fields, and data cables are connected to other data cables or related devices through connectors. In related technologies, a male head of a connector is provided with a plurality of protruding terminals, a female head of the connector is provided with holes for receiving terminals, electrical connection is established between terminals and holes, to achieve data transmission.

SUMMARY

The present disclosure provides a connector male head. The connector male head includes: a plurality of first transceiving terminals including a plurality of first data terminals arranged in a first column; a plurality of second transceiving terminals including a plurality of first data terminals arranged in a second column, wherein the first column is parallel to the second column, and the first data terminals of the first transceiving terminals are in one-to-one correspondence with the first data terminals of the second transceiving terminals, respectively; a plurality of first power terminals and a plurality of first signal terminals, wherein the first power terminals are configured to transmit power, and the first signal terminals are configured to transmit control signals; a plurality of second power terminals and a plurality of second signal terminals, wherein the second power terminals are configured to transmit power, and the second signal terminals are configured to transmit control signals; and an anti-crosstalk protrusion located between the first data terminals of the first transceiving terminals and the first data terminals of the second transceiving terminals, to reduce crosstalk between the first data terminals of the first transceiving terminals and the first data terminals of the second transceiving terminals, and the anti-crosstalk protrusion is not located between the first power terminals and the second power terminals and is not located between the first signal terminals and the second signal terminals.

The present disclosure further provides a connector female head. The connector female head includes: a plurality of first transceiving terminal connector clips including a plurality of first data terminal connector clips arranged in a first column, wherein each of the first transceiving terminal connector clips is provided with a jack; a plurality of second transceiving terminal connector clips including a plurality of first data terminal connector clips arranged in a second column, wherein the first column is parallel to the second column, each of the second transceiving terminal connector clips is provided with a jack, and the plurality of first data terminal connector clips of the plurality of first transceiving terminal connector clips are in one-to-one correspondence with the first data terminal connector clips of the plurality of second transceiving terminal connector clips, respectively; a plurality of first power terminal connector clips and a plurality of first signal terminal connector clips, wherein the first power terminal connector clips are configured to transmit power, the first signal terminal connector clips are configured to transmit control signals; a plurality of second power terminal connector clips and a plurality of second signal terminal connector clips, wherein the second power terminal connector clips are configured to transmit power, and the second signal terminal connector clips are configured to transmit control signals; and an anti-crosstalk protrusion connector clip located between the first data terminal connector clips of the first transceiving terminal connector clips and the first data terminal connector clips of the second transceiving terminal connector clips, the anti-crosstalk protrusion connector clip is provided with a jack, and the anti-crosstalk protrusion is not located between the first power terminal connector clips and the second power terminal connector clips and is not located between the first signal terminal connector clips and the second signal terminal connector clips.

DETAILED DESCRIPTION OF THE DISCLOSURE

Figure 1:
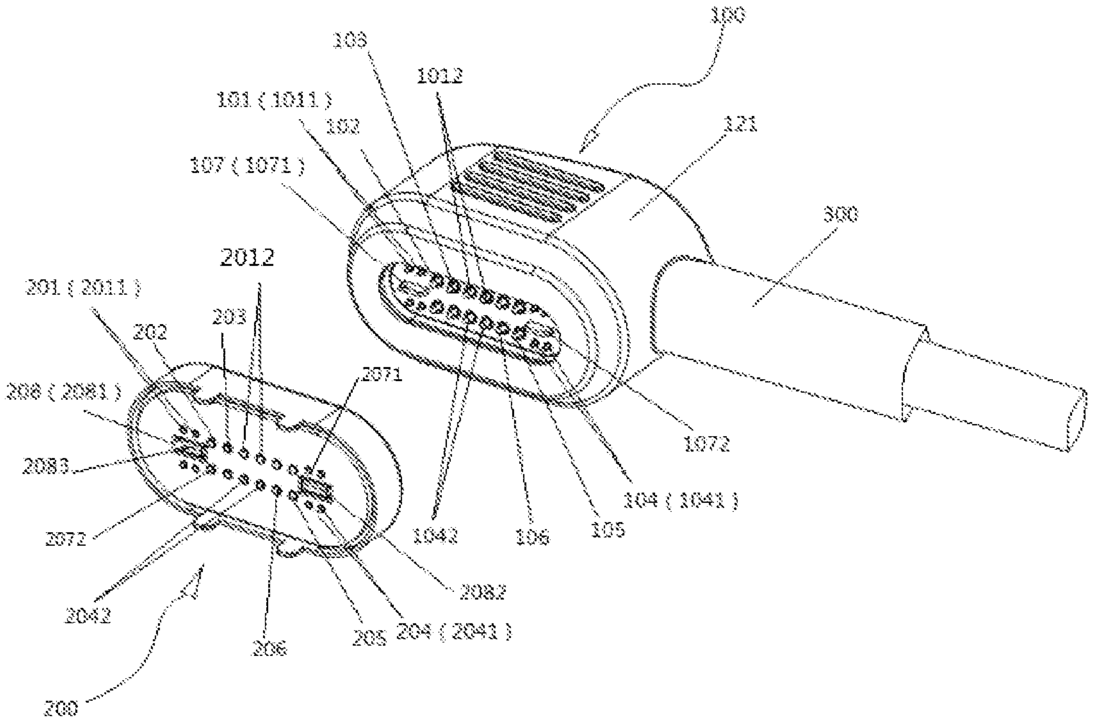
FIG. 1 is a structural schematic diagram of a connector male head and a connector female head from an angle in an embodiment of the present disclosure.
Figure 2:
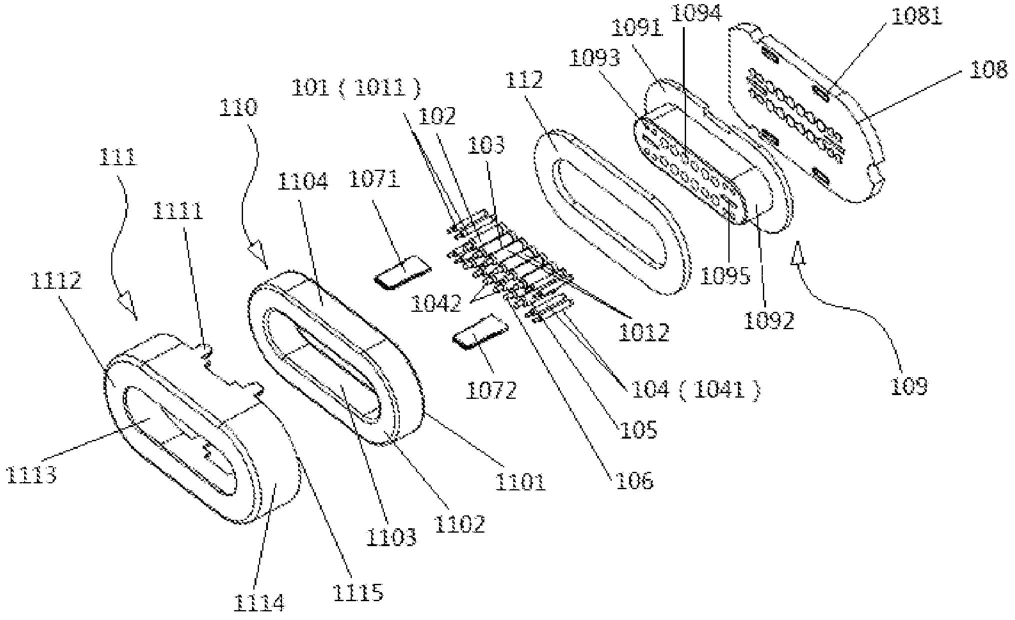
FIG. 2 is an exploded schematic diagram of a connector male head in an embodiment of the present disclosure.

The present disclosure provides a connector male head 100, as shown in FIG. 1 and FIG. 2, the connector male head includes a plurality of first transceiving terminals 101 and a plurality of second transceiving terminals 104. The plurality of first transceiving terminals 101 include a plurality of first data terminals 1011 arranged in a first column. The plurality of second transceiving terminals 104 include a plurality of first data terminals 1041 arranged in a second column. The arrangement direction of the plurality of first data terminals 1011 in the first column is parallel to the arrangement direction of the plurality of first data terminals 1041 in the second column. The first data terminals 1011 of the first transceiving terminals 101 are in one-to-one correspondence with the first data terminals 1041 of the second transceiving terminals 104, respectively. The connector male head 100 further includes an anti-crosstalk protrusion 107, and the anti-crosstalk protrusion 107 is located between the first data terminals 1011 of the first transceiving terminals 101 and the first data terminals 1041 of the second transceiving terminals 104, to reduce crosstalk between the first data terminals 1011 of the first transceiving terminals 101 and the first data terminals 1041 of the second transceiving terminals 104.

The present disclosure provides a connector male head 100, and the connector male head 100 can be connected to a data cable 300. As shown in FIG. 1 and FIG. 2, the connector male head 100 includes a plurality of first transceiving terminals 101, and the plurality of first transceiving terminals 101 include a plurality of first data terminals 1011 arranged in a first column. The connector male head 100 further includes a plurality of second transceiving terminals 104, the plurality of second transceiving terminals 104 include a plurality of first data terminals 1041 arranged in a second column, the first column is parallel to the second column, and the first data terminals 1011 of the first transceiving terminals 101 are in one-to-one correspondence with the first data terminals 1041 of the second transceiving terminals 104, respectively. The connector male head 100 further includes a plurality of first power terminals 102 and a plurality of first signal terminals 103, the first power terminals 102 are configured to transmit power, and the first signal terminals 103 are configured to transmit control signals. The connector male head 100 further includes a plurality of second power terminals 105 and a plurality of second signal terminals 106, the second power terminals 105 are configured to transmit power, and the second signal terminals 106 are configured to transmit control signals. The plurality of first power terminals 102 are in one-to-one correspondence with the plurality of second power terminals 105, respectively, and the plurality of first signal terminals 103 are in one-to-one correspondence with the plurality of second signal terminals 106, respectively. The connector male head 100 further includes an anti-crosstalk protrusion 107, the anti-crosstalk protrusion 107 is located between the first data terminals 1011 of the first transceiving terminals 101 and the first data terminals 1041 of the second transceiving terminals 104, to reduce crosstalk between the first data terminals 1011 of the first transceiving terminals 101 and the first data terminals 1041 of the second transceiving terminals 104, and the anti-crosstalk protrusion 107 is not located between the first power terminals 102 and the second power terminals 105 and is not located between the first signal terminals 103 and the second signal terminals 106.

As to the connector male head 100 of the present disclosure, the anti-crosstalk protrusion 107 is arranged between the first data terminals 1011 of the first transceiving terminals 101 and the first data terminals 1041 of the second transceiving terminals 104, to reduce mutual influence between current signals passing through the first data terminals 1011 of the first transceiving terminals 101 and current signals passing through the first data terminals 1041 of the second transceiving terminals 104, so as to reduce mutual signal crosstalk between the first data terminals 1011 of the first transceiving terminals 101 and the first data terminals 1041 of the second transceiving terminals 104 during signal transmission and signal reception, thereby improving stability of signal transmission and signal reception. Since the anti-crosstalk protrusion 107 is only arranged between the first data terminals 1011 of the first transceiving terminals 101 and the first data terminals 1041 of the second transceiving terminals 104, and no anti-crosstalk protrusion 107 is arranged between other terminals, the problem of signal crosstalk can be solved on the basis of saving materials. In addition, the anti-crosstalk protrusion 107 can also be in plug-in fit with an anti-crosstalk protrusion connector clip of an connector female head 200, to play a role of positioning.

The connector male head 100 provided with an anti-crosstalk protrusion of the present disclosure is tested, with parameters IMR (integrated multiple response), INEXT (integrated near-end crosstalk), IFEXT (integrated far-end crosstalk), IRL (integrated revenue loss) and SCD21 (common-to-differential mode conversion) all satisfying stipulated requirements.

Figure 3:
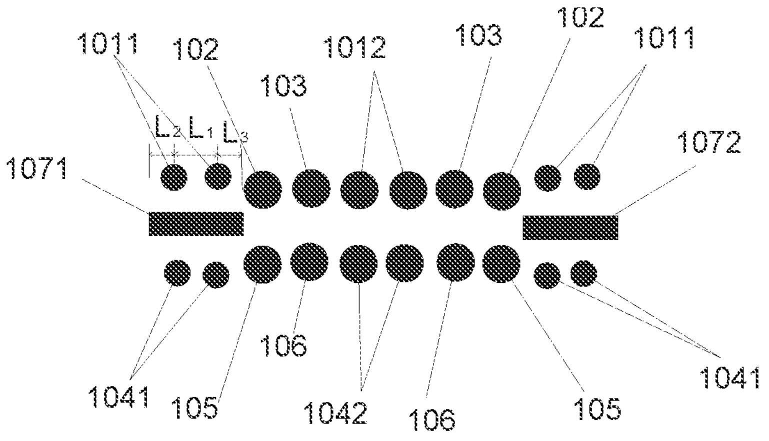
FIG. 3 is a diagram showing relative position of a terminal and an anti-crosstalk protrusion of a connector male head in an embodiment of the present disclosure.

In the present embodiment, as shown in FIG. 1 and FIG. 3, the plurality of first power terminals 102 and the plurality of first signal terminals 103 are commonly arranged in a third column. The third column is parallel to the first column, and the first column is more outward than the third column. The plurality of second power terminals 105 and the plurality of second signal terminals 106 are commonly arranged in a fourth column. The fourth column is parallel to the second column, and the second column is more outward than the fourth column. The plurality of second power terminals 105 are in one-to-one correspondence with the plurality of first power terminals 102, respectively, and the plurality of second signal terminals 106 are in one-to-one correspondence with the plurality of first signal terminals 103, respectively. Through such a setting, the distance between the first column and the second column is greater than the distance between the third column and the fourth column, such that the distance between the first data terminals of the first transceiving terminals 101 and the first data terminals of the second transceiving terminals 104 is greater. On the one hand, signal crosstalk can be reduced through increasing distance, and on the other hand, a larger space is reserved for setting the anti-crosstalk protrusion 107, such that the size of the anti-crosstalk protrusion 107 can be increased correspondingly, and signal crosstalk can be further reduced.

In the present embodiment, each terminal and the anti-crosstalk protrusion 107 are all made of metal materials. The anti-crosstalk protrusion 107 can be a plate-shaped metal protrusion, and the extension direction of the anti-crosstalk protrusion 107 along a first column is parallel to the arrangement direction of the first data terminals 1011, 1041. The distance between two ends of the anti-crosstalk protrusion 107 along the direction of the first column is greater than the distance between two ends of the first data terminals 1011, 1041 along the direction of the first column. The free end of the anti-crosstalk protrusion 107 is higher than free ends of the first data terminals 1011, 1041 along a direction from fixed ends to free ends of the first data terminals 1011, 1041. Free ends of the first data terminals 1011, 1041 are configured to be inserted into a jack of the connector female head 200 in cooperation with the connector male head 100. Through setting the anti-crosstalk protrusion 107, a metal partition is formed between the first data terminals 1011 of the first transceiving terminals 101 and the first data terminals 1041 of the second transceiving terminals 104, and in the direction from the anti-crosstalk protrusion 107 towards the first data terminals 1011, 1041, the anti-crosstalk protrusion 107 can completely block the first data terminals 1011, 1041, to form shielding, and to further reduce mutual signal crosstalk between the first data terminals 1011 of the first transceiving terminals 101 and the first data terminals 1041 of the second transceiving terminals 104. The free ends of each terminal and the anti-crosstalk protrusion 107 are configured to be inserted into the jack of the connector female head 200 in cooperation with the connector male head 100.

Generally, the first data terminals 1011 of the first transceiving terminals 101 include a plurality of terminals, for example, two terminals, and the two terminals are adjacent to each other. The first data terminals 1041 of the second transceiving terminals 104 are also a plurality of corresponding terminals, for example, two terminals, and the two terminals are adjacent to each other. The distance between two ends of the anti-crosstalk protrusion 107 along the direction of the first column is greater than the distance between two ends of the two first data terminals 1011, 1041 along the direction of the first column, that is, two adjacent first data terminals 1011, 1041 are taken as an entirety, and the distance between two ends of the anti-crosstalk protrusion 107 along the direction of the first column is greater than the distance between two ends of the two adjacent first data terminals 1011, 1041 opposite to the anti-crosstalk protrusion 107. As to the anti-crosstalk protrusion 107, the free end of the anti-crosstalk protrusion 107 is higher than the free ends of the first data terminals 1011, 1041 along the direction from fixed ends to free ends of the first data terminals 1011, 1041, that is, the free end of the anti-crosstalk protrusion 107 is higher than the free ends of two adjacent first data terminals 1011, 1041 along the direction from the fixed end to the free end. If the fixed end of the anti-crosstalk protrusion 107 and the fixed ends of the first data terminals 1011, 1041 are in the same plane, the free end of the anti-crosstalk protrusion 107 is higher than the free ends of the first data terminals.

In other embodiments, the anti-crosstalk protrusion 107 can also be made into a plate shape using other materials. A metal layer is coated or fixed on an outer wall of the plate-shaped anti-crosstalk protrusion 107 or a metal wire is printed on the outer wall of the plate-shaped anti-crosstalk protrusion 107.

In the present embodiment, the size of the free end of the anti-crosstalk protrusion 107 along the direction from fixed ends to free ends of the first data terminals 1011, 1041 is gradually reduced. Free ends of the first data terminals 1011, 1041 are configured to be inserted into the jack of the connector female head 200 cooperated with the connector male head 100. The size of the free end of the anti-crosstalk protrusion 107 is gradually reduced, such that the anti-crosstalk protrusion 107 is aligned with the jack of the connector female head 200 and is inserted into the jack. The structure of the connector female head 200 and coordination between the connector female head 200 and the connector male head 100 will be introduced in detail below.

The first power terminal 102 includes one power terminal and one grounding terminal, and the second power terminal 105 includes one grounding terminal and one power terminal. The power terminal in the third column corresponds to the grounding terminal in the fourth column, and the grounding terminal in the third column corresponds to the power terminal in the fourth column.

The connector can be a Type-C connector, as shown in FIG. 1 and FIG. 3. Optionally, the connector can be of other types.

In addition to the first data terminals 1011, 1041 configured to transmit data signals at a first speed, the first transceiving terminal 101 and the second transceiving terminal 104 of the connector male head of the present disclosure further include second data terminals 1012, 1042 configured to transmit data signals at a second speed, and the first speed is higher than the second speed. The second data terminals 1012 of the first transceiving terminals 101 are in the third column, the second data terminals 1042 of the second transceiving terminals 104 are in the fourth column. The second data terminals 1012 of the first transceiving terminal 101 correspond to the second data terminals 1042 of the second transceiving terminals 104, and the anti-crosstalk protrusion 107 is not located between the second data terminals 1012 of the first transceiving terminals 101 and the second data terminals 1042 of the second transceiving terminals 104. The anti-crosstalk protrusion 107 is only located between the first data terminals 1011, 1041 which are configured to transmit signals at a high speed, to play a role of preventing crosstalk between signals transmitted at a high speed.

As shown in FIG. 3, the first column includes a first segment located at a left end in the figure and a second segment located at a right end in the figure, the first segment and the second segment are arranged at two sides of the third column, respectively. In the third column, the second data terminals 1012 are located in the middle position, the first signal terminals 103 and the first power terminals 102 are arranged in sequence in a direction from the middle position to the two ends. The second column includes a first segment and a second segment, the first segment and the second segment of the second column are arranged at two sides of the fourth column, respectively. In the fourth column, the second data terminals 1042 are located in the middle position, and the second signal terminals 106 and the second power terminals 105 are arranged in sequence in a direction from the middle position to the two ends. Two anti-crosstalk protrusions 107 are respectively located between the first data terminals in the first column and the second column of the first segment and between the first data terminals in the first column and the second column of the second segment. Through such a setting, the first data terminals 1011, 1041 are farthest from the second data terminals 1012, 1042, thereby reducing influence of transmission of high-speed data signals by the first data terminals 1011, 1041 on transmission of low-speed data signals by the second data terminals 1012, 1042. High-speed data signals and low-speed data signals only represent that the first data terminals 1011, 1041 transmit data at a higher speed and the second data terminals 1012, 1042 transmit data at a lower speed.

The distance between two first data terminals 1011 located in the same segment is $L_1$. In the direction parallel to the first column, the distance between the first data terminal 1101 located at the outer side and the outer side of the anti-crosstalk protrusion 1071 is $L_2$, the distance between the first data terminal 1011 located at the inner side and the inner side of the anti-crosstalk protrusion 1071 is $L_3$, and $L_1<L_2+L_3$. Through tests, the effect of preventing signal crosstalk can be further improved through such a setting.

TABLE 1

| A10 | A9 | A8 | A7 | A6 | A5 | A4 | A3 | A2 | A1 |
|---|---|---|---|---|---|---|---|---|---|
| RX2+ | RX2− | GND | SUB1 | D− | D+ | CC | VBUS | TX1− | TX1+ |
| TX2+ | TX2− | VBUS | CC2 | D+ | D− | SUB2 | GND | RX1− | RX1+ |
| B1 | B2 | B3 | B4 | B5 | B6 | B7 | B8 | B9 | B10 |

As shown in Table 1, the terminals of the connector male head 100 include RX2+, RX2−, GND, SUB1, D−, D+, CC, VBUS, TX1− and TX1+ which are arranged in sequence. Wherein D− and D+ are second data terminals 1012, CC and SUB1 are first signal terminals 103, VBUS and GND are first power terminals 102, wherein GND is the grounding terminal, VBUS is the power terminal, TX1−, TX1+, RX2− and RX2+ are first data terminals 1011. The connector male head 100 further includes TX2+, TX2−, VBUS, CC2, D+, D−, SUB2, GND, RX1− and RX1+ which are arranged in sequence. Wherein D− and D+ are second data terminals 1042, SUB2 and CC2 are second signal terminals 106, GND and VBUS are second power terminals 105, wherein GND is the grounding terminal, VBUS is the power terminal, and RX1+, RX1−, TX2− and TX2+ are first data terminals 1041. In the present embodiment, a first anti-crosstalk protrusion 1071 is arranged between RX2+ and RX2− in the first transceiving terminals 101 and TX2+ and TX2− in the second transceiving terminals 104, and a second anti-crosstalk protrusion 1072 is arranged between TX1− and TX1+ in the first transceiving terminals 101 and RX1− and RX1+ in the second transceiving terminals 104.

In some embodiments, the diameter of the first data terminals 1011 of the first transceiving terminals 101 and the diameter of the first data terminals 1041 of the second transceiving terminals 104 are referred to as first diameter, the diameter of other terminals is referred to as second diameter, and the first diameter is smaller than the second diameter. Through narrowing the diameter of the first data terminals 1011, 1041, more space can be reserved between the first data terminals 1011, 1041 for arrangement of the anti-crosstalk protrusion 107, such that the thickness of the anti-crosstalk protrusion 107, that is, the size in the direction perpendicular to the plate shape, has more options. The first diameter can be 0.22-0.26 mm, and can be 0.24 mm in an embodiment, and the second diameter can be 0.32-0.36 mm, and can be 0.34 mm in an embodiment.

Figure 4:
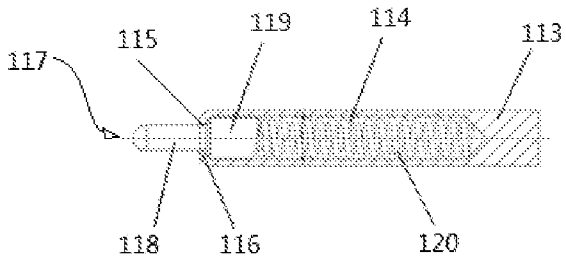
FIG. 4 is a schematic diagram of a longitudinal sectional structure of a terminal of a connector male head in an embodiment of the present disclosure.

In the present disclosure, a pogopin type is adopted for both the terminals with the first diameter and the terminals with the second diameter, the structures are the same. As shown in FIG. 4, a barrel-shaped piece 113 and a pop-up piece 117 are included. The pop-up piece 117 is column-shaped. The barrel-shaped piece 113 is provided with an accommodating cavity 114. One end of the barrel-shaped piece 113 is provided with an opening 115 in communication with the accommodating cavity 114, and this end of the barrel-shaped piece 113 is also provided with a limiting shoulder 116 which surrounds the opening 115, and the other end of the barrel-shaped piece 113 is closed. The pop-up piece 117 includes a first segment 118 located in the accommodating cavity 114 and a second segment 119 which can extend out of and partially retracted into the accommodating cavity 114. The diameter of the first segment 118 is greater than the diameter of the second segment 119. The first segment 118 cannot extend out of the accommodating cavity 114 under the blocking of the limiting shoulder 116. The terminal further includes an elastic piece 120 located in the accommodating cavity 114. In the present embodiment, the elastic piece 120 is a spring. The elastic piece 120 is located between the second segment 119 of the pop-up piece 117 and the end of the accommodating cavity 114, to apply a force to the pop-up piece 117 to enable the pop-up piece 117 to extend outwards.

In another embodiment, the diameters of the first power terminals 102 and the second power terminals 105 are greater than the diameters of other terminals. In addition, since greater current needs to pass through the first power terminals 102 and the second power terminals 105, the distance between all the power terminals and adjacent terminals is greater than the distance between other adjacent terminals, thereby avoiding shortage caused when other terminals are collided, and reducing interference of electromagnetic signals of the power terminals on other terminals.

As shown in FIG. 2, the connector male head 100 further includes a male head accommodating piece 109. The male head accommodating piece 109 includes a plate-shaped part 1091 and an accommodating part 1092 fixedly connected to a side of the plate-shaped part 1091. The other side of the plate-shaped part 1091 is used for attaching to a circuit board 108. The accommodating part 1092 is configured to fix respective terminals and the anti-crosstalk protrusion 107. The plate-shaped part 1091 is made of metal materials, and the accommodating part 1092 is injection molded. The male head accommodating piece 109 is provided with a plurality of holes penetrating through the plate-shaped part 1091 and the accommodating part 1092. The plurality of holes include first holes 1093 in one-to-one correspondence with the first data terminals 1011, 1041 with the positions and shapes, respectively, second holes 1094 in one-to-one correspondence with other terminals with the positions and shapes, respectively, and third holes 1095 in one-to-one correspondence with the anti-crosstalk protrusions 107 with the positions and shapes, respectively. Each terminal and the anti-crosstalk protrusion 107 respectively penetrate through corresponding holes and are fixed, and free ends of the anti-crosstalk protrusions 107 all extend out of the holes and are close to the accommodating part 1092, to cooperate with the connector female head 200. Free ends 107 of the anti-crosstalk protrusion 107 protrude more from the accommodating part 1092 than free ends of the first data terminals 1011, 1041, and the fixed end of each terminal and the anti-crosstalk protrusion 107 all extend out of the holes and are close to the plate-shaped part 1091. Through the above setting, each terminal and the anti-crosstalk protrusion 107 are stably fixed in the male head accommodating part 1092, and the anti-crosstalk protrusion 107 can stably shield signals to prevent crosstalk.

In some embodiments, the connector male head 100 further includes a metal housing 111. The metal housing 111 includes a first wall 1112 configured to define a first opening 1113 and a second wall 1114 configured to define a second opening 1115. The first wall 1112 is perpendicular to the second wall 1114. The first opening 1113 is smaller than the second opening 1115. The first opening 1113 is configured to expose an end face, away from the plate-shaped part 1091, of the accommodating part 1092. As shown in FIG. 1, an end face, away from the plate-shaped part 1091, of the accommodating part 1092 is located in the metal housing 111, and has a certain distance from the first opening 1113 of the metal housing 111, and each terminal and the anti-crosstalk protrusion extend at the distance. The second opening 1115 is configured to expose an end face, away from the accommodating part, of the plate-shaped part 1091. The end face is attached to the circuit board 108. The metal housing 111 can protect all the terminals and the anti-crosstalk protrusions 107. The first opening 1113 of the metal housing 111 is configured to enable the terminal and the anti-crosstalk protrusion 107 to cooperate with the connector female head 200.

In a direction from the fixed end to the free end of each terminal, an outer surface of the first wall 1112 of the metal housing 111 is higher than each terminal and the free end of the anti-crosstalk protrusion 107, to protect the terminal and the anti-crosstalk protrusion 107.

In some embodiments, the sizes by which free ends of the first data terminals 1011, 1041 and the second data terminals 1012, 1042 protrude from the accommodating part 1092 of the male head accommodating piece 109 are 0.4 mm-0.45 mm, for example, 0.435 mm.

The sizes by which free ends of other terminals protrude from the accommodating part 1092 of the male head accommodating piece 109 are 0.52 mm-0.58 mm, for example, 0.55 mm.

The sizes of the anti-crosstalk protrusions 107 in the direction perpendicular to the first column are 0.18 mm-0.22 mm, for example, 0.2 mm. The sizes by which free ends of the anti-crosstalk protrusions 107 protrude from the accommodating part of the male head accommodating piece 109 are 0.65 mm-0.75 mm, for example, 0.7 mm. In the direction perpendicular to the first column, the distance from the side face, facing towards the first data terminals, of the anti-crosstalk protrusion 107 to the first data terminals towards which the anti-crosstalk protrusion 107 faces is 0.95 mm-1.05 mm, for example, 1 mm.

In some embodiments, the connector male head 100 further includes an annular magnet 110. The annular magnet 110 is sleeved outside the accommodating part 1092 of the male head accommodating piece 109 and is accommodated in the metal housing 111. The annular magnet 110 is provided with an annular first surface 1101, an annular second surface 1102 opposite to the first surface 1101, and a first side face 1103 and a second side face 1104 which connect the first surface 1101 and the second surface 1102. The first surface 1101 is attached to a side, close to the accommodating part, of the plate-shaped part 1091. The second surface 1102 is attached to an inner surface of the first wall 1112 of the metal housing 111. The first side face 1103 is attached outside the accommodating part 1092, and each terminal and the part, protruding from the accommodating part, of the anti-crosstalk protrusion extend in a space defined by the first side face 1103. The second side face 1104 is attached to an inner surface of the second wall 1114 of the metal housing 111. The annular magnet 110 enables the connector male head 100 to achieve position alignment and connection with the connector female head 200 provided with an annular magnet through magnetic attraction. Therefore, the connector male head 100 can be connected to the connector female head 200 more conveniently and rapidly, moreover, under the effect of a magnetic force, connection between the two is more stable and reliable, and disengagement from each other will not easily occur.

The connector male head 100 further includes an anti-collision gasket 112 sleeved outside the accommodating part 1092 of the male head accommodating piece 109. The anti-collision gasket 112 is formed integrally, and is shaped like an annular runway as a whole. The anti-collision gasket 112 is located between the annular magnet 110 and the plate-shaped part 1091 of the male head accommodating piece 109. Two side faces of the anti-collision gasket 112 are respectively attached to the first surface 1101 of the annular magnet 110 and a side, close to the accommodating part 1092, of the plate-shaped part 1091 of the male head accommodating piece 109. The anti-collision gasket 112 can prevent collision between the annular magnet 110 and the plate-shaped part 1091 of the male head accommodating part 1092 under the effect of a magnetic force when the connector male head 100 is connected to the connector female head 200, so as to perform anti-collision protection on the plate-shaped part 1091, and also prevent loosening of connection between the terminals and anti-crosstalk protrusion 107 and the plate-shaped part 1091.

The connector male head 100 further includes a circuit board 108 for soldering with a cable of a data cable 300, the fixed end of each terminal is soldered and electrically connected to the circuit board 108, and the fixed end of the anti-crosstalk protrusion 107 is soldered with the circuit board 108, and grounding is achieved. The metal housing 111 includes a protrusion 1111 connected to the second wall 1114, for example, the second wall 1114 extends towards a direction away from the first wall 1112 to form a protrusion 1111. A through hole 1081 is formed on an edge of the circuit board 108. The protrusion 1111 extends into the through hole 1081 to fix the metal housing 111 and the circuit board 108. In the present embodiment, the through hole 1081 of the circuit board 108 is plated with copper, the protrusion 1111 of the metal housing 111 is made of metal, and fixed connection between the protrusion 1111 and the through hole 1081 can achieve grounding of the metal housing 111.

Figure 5:
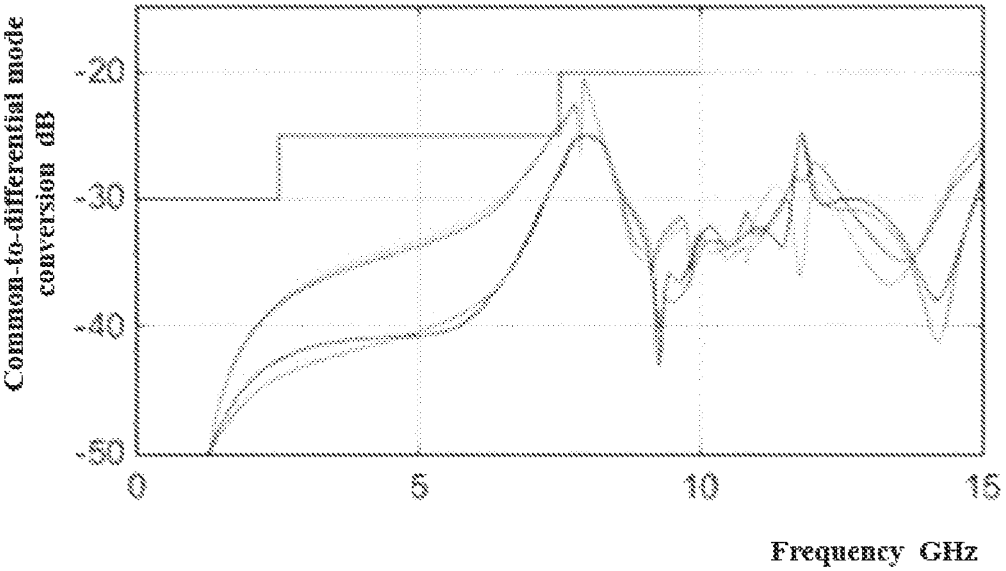
FIG. 5 is a graph obtained when a connector male head in an embodiment of the present disclosure is subjected to a common-to-differential mode conversion test.

The parameter SCD21 (common-to-differential mode conversion) of the connector male head 100 and the connector female head 200 of the present disclosure is tested, with data forming curves as shown in FIG. 5. The horizontal line in the figure represents a required value of the parameter under a corresponding frequency, and when lower than the required value, data of the parameter can be determined to satisfy requirements. The curves shown in FIG. 5 are all below the corresponding horizontal line, therefore, the value of the parameter satisfies stipulated requirements.

The connector male head 100 further includes an injection molded housing 121, the injection molded housing 121 wraps the circuit board 108 and part of the metal housing 111, to protect the circuit board 108 and the metal housing 111, and the first wall 1112 and part of the second wall 1114 of the metal housing 111 are exposed out of the injection molded housing 121. In an embodiment, a connector female head 200 is mounted in a digital device (not shown in the figure), the digital device is provided with a cavity configured to accommodate a connector female head 200, the cavity is provided with an opening in communication with the outside, such that the part, exposed out of the injection molded housing 121, of the second wall 1114 of the metal housing 111 of the connector male head 100 can extend into the cavity, the part, extending into the cavity, of the second wall 1114 of the metal housing 111 cooperates with an inner wall, close to the opening, of the cavity, and the inner wall, close to the opening, of the cavity restricts the part, extending into the cavity, of the second wall 1114 of the metal housing 111, such that the connector male head 100 is not easy to shake or be disengaged from the digital device when subjected to an external force. The digital device can be a pair of digital glasses, and the connector female head 200 can be arranged in the cavity of legs of the glasses.

In an embodiment, the second wall 1114 of the metal housing 111 is retracted inwards at the position at which the second wall 1114 is connected to the first wall 1112, correspondingly, the second side face 1104 of the annular magnet 110 is retracted inwards at the position at which the second side face 1104 is connected to the first surface 1102. Inward retraction of the second wall 1114 of the metal housing 111 and the second side face 1104 of the annular magnet 110 enables easy insertion into an opening of the digital device. While the part, exposed out of the injection molded housing 121, of the second wall 1114 of the metal housing 111 of the connector male head 100 is inserted into the cavity, each terminal of the connector male head 100 is inserted into each terminal connector clip of the connector female head 200, and the anti-crosstalk protrusion 107 of the connector male head 100 is inserted into the anti-crosstalk protrusion connector clip 208, to finish cooperation between the connector male head 100 and the connector female head 200.

In the present embodiment, the anti-collision gasket 112 is made of metal materials. The plate-shaped part 1091 of the male head accommodating piece 109 is provided with a grounding terminal, the grounding terminal of the plate-shaped part 1091 is closely fitted with the anti-collision gasket 112, and the annular magnet 110 can achieve grounding through the anti-collision gasket 112, the plate-shaped part 1091, and the circuit board 108. The plate-shaped part 1091 can also be injection molded like the accommodating part 1092.

In the present embodiment, the width of the anti-collision gasket 112 and the width of the annular magnet 110 are both greater than the width of the plate-shaped part 1091, and the length of the anti-collision gasket 112 and the length of the annular magnet 110 are both greater than the length of the plate-shaped part 1091. In a direction perpendicular to an axis, the size of the anti-collision gasket 112 and the size of the annular magnet 110 are both greater than the size of the plate-shaped part 1091. The housing is sleeved outside the anti-collision gasket 112 and the annular magnet 110, thereby preventing soldering of the plate-shaped part 1091 when the housing and the circuit board 108 are soldered. Meanwhile, after the housing is disconnected to the circuit board 108, each internal part can be detached.

transceiving terminal connector clips 204 include a plurality of first data terminal connector clips 2041 arranged in a second column, and each second data terminal connector clip 2041 is provided with a first jack 2071. The arrangement direction of the plurality of first data terminal connector clips 2011 in the first column is parallel to the arrangement direction of the plurality of second transceiving terminal connector clips 204 in the second column. The plurality of first data terminal connector clips 2011 of the plurality of first transceiving terminal connector clips 201 are in one-to-one correspondence with the first data terminal connector clips 2041 of the plurality of second transceiving terminal connector clips 204, respectively. The connector female head 200 further includes an anti-crosstalk protrusion connector clip 208, the anti-crosstalk protrusion connector clip 208 is located between the first data terminal connector clips 2011 of the first transceiving terminal connector clips 201 and the first data terminal connector clips 2041 of the second transceiving terminal connector clips 204, and the anti-crosstalk protrusion connector clip 208 is provided with a jack 2083. The anti-crosstalk protrusion connector clip 208 cooperates with the anti-crosstalk protrusion of the connector male head 100, that is, the anti-crosstalk protrusion can be inserted into the jack 2083 of the anti-crosstalk protrusion connector clip 208 to form close cooperation, so as to form shielding between the first data terminal connector clips 2011, 2041, thereby reducing mutual interference between signals passing through the first data terminal connector clips 2011 of the first transceiving terminal connector clips 201 and signals passing through the first data terminal connector clips 2041 of the second transceiving terminal connector clips 204.

Figure 6:
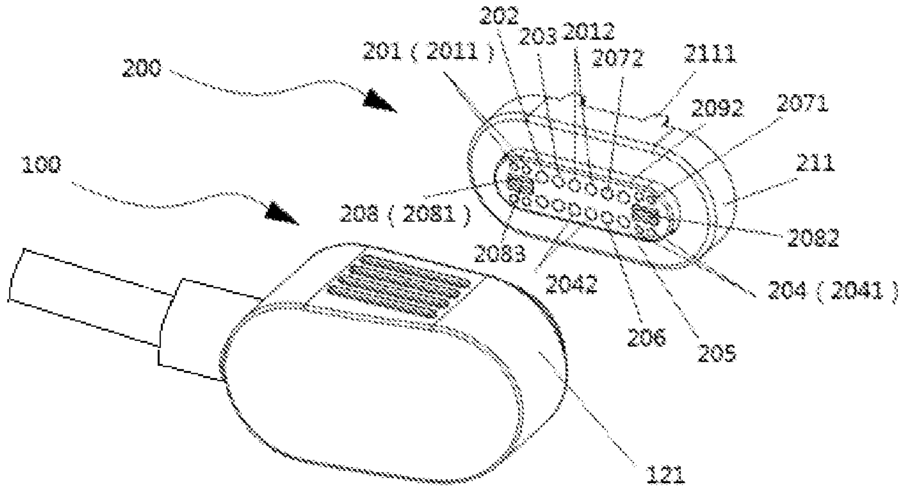
FIG. 6 is a structural schematic diagram of a connector male head and a connector female head from another angle in an embodiment of the present disclosure.
Figure 7:
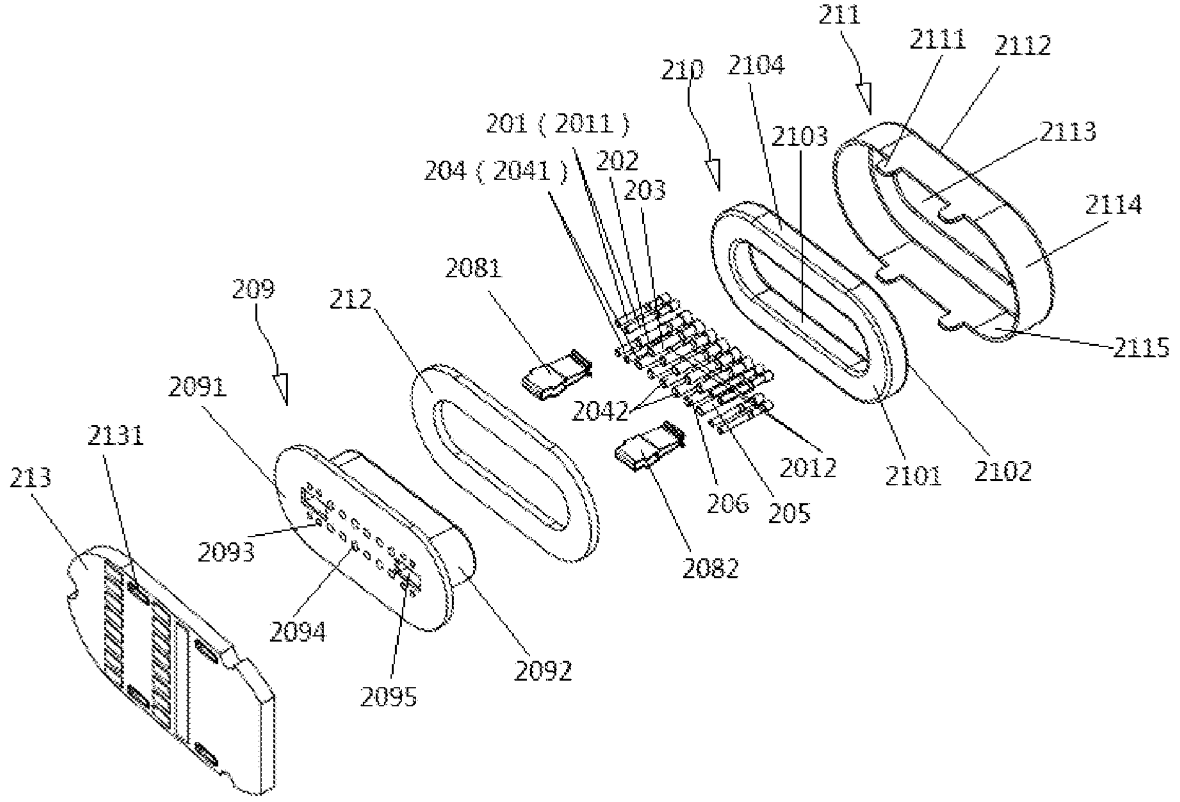
FIG. 7 is an exploded schematic diagram of a connector female head in an embodiment of the present disclosure.

The present disclosure further provides a connector female head 200, to cooperate with the connector male head 100. As shown in FIG. 6 and FIG. 7, the connector female head 200 includes a plurality of first transceiving terminal connector clips 201, the plurality of first transceiving terminal connector clips 201 include a plurality of first data terminal connector clips 2011 arranged in the first column, and each first data terminal connector clip 2011 is provided with a first jack 2071. The connector female head 200 further includes a plurality of second transceiving terminal connector clips 204, the plurality of second transceiving terminal connector clips 204 include a plurality of first data terminal connector clips 2041 arranged in a second column, the first column is parallel to the second column, each second data terminal connector clip 2041 is provided with a first jack 2071, and the plurality of first data terminal connector clips 2011 of the plurality of first transceiving terminal connector clips 201 are in one-to-one correspondence with the first data terminal connector clips 2041 of the plurality of second transceiving terminal connector clips 204, respectively. The connector female head 200 further includes a plurality of first power terminal connector clips 202 and a plurality of first signal terminal connector clips 203, the first power terminal connector clips 202 and the first signal terminal connector clips 203 are all provided with a second jack 2072, the first power terminal connector clips 202 are configured to transmit power, and the first signal terminal

TABLE 2

| | | | | | | | | | | |
|---|---|---|---|---|---|---|---|---|---|---|
| A10 | A9 | A8 | A7 | A6 | A5 | A4 | A3 | A2 | A1 |
| GND | RX2+ | RX2− | SUB1 | D− | D+ | CC | TX1− | TX1+ | VBUS |
| VBUS | TX2+ | TX2− | CC2 | D+ | D− | SUB2 | RX1− | RX1+ | GND |
| B1 | B2 | B3 | B4 | B5 | B6 | B7 | B8 | B9 | B10 |

In another embodiment, as shown in Table 2, the terminals of the connector male head 100 include GND, RX2+, RX2−, SUB1, D−, D+, CC, TX1−, TX1+ and VBUS which are arranged in sequence. The terminals of the connector male head 100 further include VBUS, TX2+, TX2−, CC2, D+, D−, SUB2, RX1−, RX1+ and GND which are arranged in sequence.

The present disclosure further provides a connector female head 200 to cooperate with the connector male head 100. As shown in FIG. 6 and FIG. 7, the connector female head 200 includes a plurality of first transceiving terminal connector clips 201 and a plurality of second transceiving terminal connector clips 204. The plurality of first transceiving terminal connector clips 201 include a plurality of first data terminal connector clips 2011 arranged in a first column, and each first data terminal connector clip 2011 is provided with a first jack 2071. The plurality of second connector clips 203 are configured to transmit control signals. The connector female head 200 further includes a plurality of second power terminal connector clips 205 and a plurality of second signal terminal connector clips 206, the second power terminal connector clips 205 and the second signal terminal connector clips 206 are all provided with a second jack 2072, the second power terminal connector clips 205 are configured to transmit power, and the second signal terminal connector clips 206 are configured to transmit control signals. The connector female head 200 further includes an anti-crosstalk protrusion connector clip 208, the anti-crosstalk protrusion connector clip 208 is located between the first data terminal connector clips 2011 of the first transceiving terminal connector clips 201 and the first data terminal connector clips 2041 of the second transceiving terminal connector clips 204, and the anti-crosstalk protrusion connector clip 208 is provided with a jack 2083. The anti-crosstalk protrusion connector clip 208 is not located between the first power terminal connector clips 202 and the second power terminal connector clips 205, and is not located between the first signal terminal connector clips 203 and the second signal terminal connector clips 206. The anti-crosstalk protrusion connector clip 208 cooperates with the anti-crosstalk protrusion of the connector male head 100, that is, the anti-crosstalk protrusion can be inserted into the jack 2083 of the anti-crosstalk protrusion connector clip 208 to form close cooperation, so as to form shielding between the first data terminal connector clips 2011, 2041, and to reduce mutual interference between signals passing through the first data terminal connector clips 2011 of the first transceiving terminal connector clips 201 and signals passing through the first data terminal connector clips 2041 of the second transceiving terminal connector clips 204.

A plurality of first power terminal connector clips 202 and a plurality of first signal terminal connector clips 203 are commonly arranged in a third column, the third column is parallel to the first column, and the first column is more outward than the third column. A plurality of second power terminal connector clips 205 and a plurality of second signal terminal connector clips 206 are commonly arranged in a fourth column, the fourth column is parallel to the second column, and the second column is more outward than the fourth column. The plurality of second power terminal connector clips 205 are in one-to-one correspondence with the plurality of first power terminal connector clips 202, respectively, and the plurality of second signal terminal connector clips 206 are in one-to-one correspondence with the plurality of first signal terminal connector clips 203, respectively. Through such a setting, the distance between the first column in which the first data terminal connector clips 2011 of the first transceiving terminal connector clips 201 are located and the second column in which the first data terminal connector clips 2041 of the second transceiving terminal connector clips 204 are located is enlarged, therefore, on the one hand, signal crosstalk can be reduced through increasing the distance, and on the other hand, the thickness of the anti-crosstalk protrusion connector clip 208 can also be further increased, and signal crosstalk can be further reduced.

Optionally, the anti-crosstalk protrusion connector clip 208 is made of metal materials. The jack 2083 of the anti-crosstalk protrusion connector clip 208 is plate-shaped, and is suitable for closely cooperation with the plate-shaped anti-crosstalk protrusion 107. The jack 2083 of the anti-crosstalk protrusion connector clip 208 is a free end of the anti-crosstalk protrusion connector clip 208. The distance between two ends of the anti-crosstalk protrusion connector clip 208 along the direction of the first column is greater than the distance between two ends of the first data terminal connector clips 2011, 2041, opposite to the anti-crosstalk protrusion connector clip 208, along the direction of the first column. The expression "the first data terminal connector clip opposite to the anti-crosstalk protrusion connector clip" herein is taken as an entirety, and the entirety can include a plurality of adjacent first data terminal connector clips 2011, 2041, for example, two adjacent first data terminal connector clips. Along the direction from fixed ends to free ends of the first data terminal connector clips 2011, 2041, the free end of the anti-crosstalk protrusion connector clip 208 is higher than free ends of the first data terminal connector clips 2011, 2041. The jacks 2083 of the first data terminal connector clips 2011, 2041 are used for insertion of the first data terminals 1011, 1041 of the connector male head 100 in cooperation with the connector female head 200. The jacks 2083 of the first data terminal connector clips 2011, 2041 are free ends of the first data terminal connector clips 2011, 2041, in the direction from the anti-crosstalk protrusion connector clips 208 towards the first data terminal connector clips 2011, 2041, the anti-crosstalk protrusion connector clips 208 can completely block the first data terminal connector clips 2011, 2041, to form shielding between the first data terminal connector clip 2011 of the first transceiving terminal connector clip 201 and the first data terminal connector clip 2041 of the second transceiving terminal connector clip 204, and to further improve the effect of preventing crosstalk.

Figure 9:
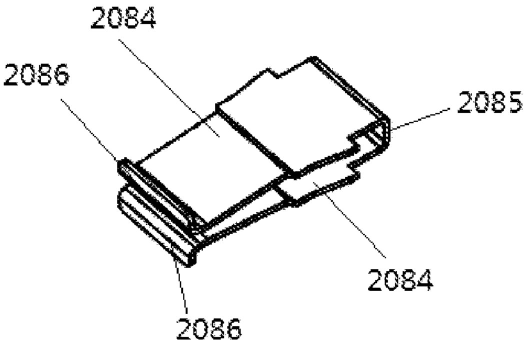
FIG. 9 is a structural schematic diagram of an anti-crosstalk protrusion connector clip of a connector female head in an embodiment of the present disclosure.

As shown in FIG. 9, the anti-crosstalk protrusion connector clip includes two opposite clamping pieces 2084 and a connecting part 2085 configured to connect opposite ends of the two clamping pieces 2084. Two clamping pieces 2084 and the connecting part 2085 are integrated into a "U" shape. The connecting part 2085 constitutes a "U"-shaped bottom, and the distance between one of the ends, away from the connecting part 2085, of the two clamping pieces 2084 is smaller than the distance between the other of the ends, connecting with the connecting part 2085, of the two clamping pieces 2084. One end, away from the "U"-shaped bottom, of each clamping piece 2084 bends towards the direction away from the other clamping piece 2084 to form a guiding piece 2086, and a guiding included angle less than 180° is formed between two guiding pieces 2086. A space for insertion of the anti-crosstalk protrusion of the connector male head is formed in the space between two clamping pieces 2084, and the parts of two clamping pieces 2084 close to each other can apply a clamping force to the anti-crosstalk protrusion for insertion of the connector male head, such that the anti-crosstalk protrusion is not easily disengaged from the anti-crosstalk protrusion connector clip, and a guiding included angle formed by two guiding pieces 2086 enables easy insertion of the anti-crosstalk protrusion into the anti-crosstalk protrusion connector clip. The anti-crosstalk protrusion connector clip can be made of elastic metal sheets.

In an embodiment, the first transceiving terminal connector clips 201, the second transceiving terminal connector clips 204, the first power terminal connector clips 202, the first signal terminal connector clips 203, the second power terminal connector clips 205 and the second signal terminal connector clips 206 are all barrel-shaped, and a space defined by a barrel-shaped inner wall constitutes a corresponding jack.

In an embodiment, the connector female head 200 can be of a Type-C type. Optionally, the connector female head 200 can also be of other types.

In an embodiment, in addition to including first data terminal connector clips configured to transmit data signals at a first speed, the first transceiving terminals and the second transceiving terminals further include second data terminal connector clips 2012, 2042 configured to transmit data signals at a second speed, the first speed is higher than the second speed. The second data terminal connector clips 2012 of the first transceiving terminal connector clips 201 are in the third column, the second data terminal connector clips 2042 of the second transceiving terminal connector clips 204 are in the fourth column, and the second data terminal connector clips 2012 of the first transceiving terminal connector clips 201 correspond to the second data terminal connector clips 2042 of the second transceiving terminal connector clips 204. The anti-crosstalk protrusion connector clip 208 is not located between the second data terminal connector clips 2012 of the first transceiving terminal connector clips 201 and the second data terminal connector clips 2042 of the second transceiving terminal connector clips 204. The anti-crosstalk protrusion connector clip 208 is arranged between the first data terminal connector clips 2011, 2041, to prevent mutual interference between data signals transmitted at a high speed.

The first power terminal connector clips 202 include one power terminal connector clip and one grounding terminal connector clip, the second power terminal connector clips 205 include one grounding terminal connector clip and one power terminal connector clip, the power terminal connector clips in the third column correspond to the grounding terminal connector clips in the fourth column, and the grounding terminal connector clips in the third column correspond to the power terminal connector clips in the fourth column.

Figure 8:
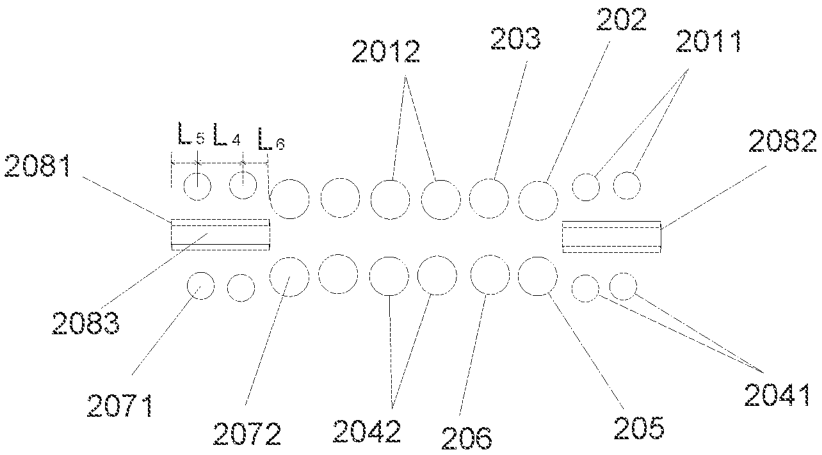
FIG. 8 is diagram showing a relative position of respective terminal connector clips and an anti-crosstalk protrusion connector clip of a connector female head in an embodiment of the present disclosure.

As shown in FIG. 8, the first column includes a first segment and a second segment. The first segment and the second segment are located at two ends of the third columns, respectively. In the third column, the second data terminal connector clips 2012 are located in a middle position, and the first signal terminal connector clips 203 and the first power terminal connector clips 202 are arranged in sequence in the direction from a middle position to two ends. The second column includes a first segment and a second segment. The first segment and the second segment in the second column are arranged at two ends of the fourth column, respectively. In the fourth column, the second data terminal connector clips 2042 are located in the middle position, and the second signal terminal connector clips 206 and the second power terminal connector clips 205 are arranged in sequence in a direction from the middle position to two ends. Through such a setting, the first data terminal connector clips 2011, 2041 are farthest from the second data terminal connector clips 2012, 2042, thereby reducing influence of transmission of high-speed data signals by the first data terminal connector clips 2011, 2041 on transmission of low-speed data signals by the second data terminal connector clips 2012, 2042. High-speed data signals and low-speed data signals only represent that the first data terminal connector clips 2011, 2041 transmit data at a higher speed and the second data terminal connector clips 2012, 2042 transmit data at a lower speed.

The distance between two first data terminal connector clips 2011 located in the same segment is $L_4$. In the direction parallel to the second column, the distance between the first data terminal connector clip 2101 located at the outer side and the outer side of the anti-crosstalk protrusion connector clip 2081 is $L_5$, the distance between the first data terminal connector clip 2011 located at the inner side and the inner side of the anti-crosstalk protrusion connector clip 2081 is $L_6$, and $L_4<L_5+L_6$. Through tests, the effect of preventing signal crosstalk can be further improved through such a setting.

TABLE 3

| | | | | | | | | | |
|---|---|---|---|---|---|---|---|---|---|
| A1 | A2 | A3 | A4 | A5 | A6 | A7 | A8 | A9 | A10 |
| TX1+ | TX1− | VBUS | CC | D+ | D− | SUB1 | GND | RX2− | RX2+ |
| RX1+ | RX1− | GND | SUB2 | D− | D+ | CC2 | VBUS | TX2− | TX2+ |
| B10 | B9 | B9 | B9 | B9 | B9 | B9 | B9 | B9 | B1 |

As shown in Table 3, the connector clips of the connector female head 200 include TX1+, TX1−, VBUS, CC, D+, D−, SUB1, GND, RX2− and RX2+. Wherein D− and D+ are second data terminal connector clips 2012, CC and SUB1 are first signal terminal connector clips 203, VBUS and GND are first power terminal connector clips 202, wherein GND is the grounding terminal connector clip, VBUS is the power terminal connector clip, TX1+, TX1−, RX2− and RX2+ are first data terminal connector clips 2011. The terminal connector clips of the connector female head 200 further include RX1+, RX1−, GND, SUB2, D−, D+, CC2, VBUS, TX2− and TX2+. Wherein D− and D+ are second data terminal connector clips 2042, SUB2 and CC2 are second signal terminal connector clips 206, GND and VBUS are second power terminal connector clips 205, wherein GND is the grounding terminal connector clip, VBUS is the power terminal connector clip, and RX1+, RX1−, TX2− and TX2+ are first data terminal connector clips 2041. In the present embodiment, a first anti-crosstalk protrusion 2081 is arranged between TX1−, TX1+ in the first transceiving terminal connector clips 201 and RX1− and RX1+ in the second transceiving terminal connector clips 204, and a second anti-crosstalk protrusion 2082 is arranged between RX2+, RX2− in the first transceiving terminal connector clips 201 and TX2+ and TX2− in the second transceiving terminal connector clips 204. Each connector clip shown in Table 3 is in plug-in fit with each terminal shown in Table 1.

The diameter of the first jack 2071 of the first data terminal connector clips 2011, 2041 is referred to as a first diameter, the diameter of the second jack 2072 of other terminal connector clips is referred to as a second diameter, and the first diameter is smaller than the second diameter. Through narrowing the diameter of the first jack 2071 of the first data terminal connector clips 2011, 2041, more space can be reserved to set the anti-crosstalk protrusion connector clip 208, such that the thickness of the anti-crosstalk protrusion connector clip 208, that is, there are more options for the size in the direction perpendicular to the plate shape. When the thickness of the anti-cross protrusion connector clip 208 is greater, a better shielding effect can be obtained.

The connector female head 200 further includes a female head accommodating piece 209. The female head accommodating piece 209 includes a plate-shaped part 2091 and an accommodating part 2092 fixedly connected to a side of the plate-shaped part 2091. The female head accommodating piece 209 is provided with a plurality of holes penetrating through the plate-shaped part 2091 and the accommodating part 2092. The holes include a first hole 2093 in cooperation with the first data terminal connector clips 2011, 2041, a second hole 2094 in cooperation with other terminal connector clips and a third hole 2095 in cooperation with the anti-crosstalk protrusion connector clip 208. Each terminal connector clip and the anti-crosstalk protrusion connector clip 208 penetrate into corresponding holes of the accommodating part 2092 and are fixed, first ends of respective terminal connector clips and the anti-crosstalk protrusion connector clip 208 are in cooperation with the connector female head 200, and second ends extend out of the hole and close to the plate-shaped part 2091. After the anti-crosstalk protrusion connector clip penetrates through the third hole 2095, the limiting piece is located outside the third hole 2095, and when the anti-crosstalk protrusion of the connector male head is inserted into the third jack, the guiding piece enables easy insertion of the anti-crosstalk protrusion.

The connector female head 200 further includes a metal housing 211. The metal housing 211 includes a first wall 2112 configured to define the first opening 2113 and a second wall 2114 configured to define the second opening 2115, and the first wall 2112 is perpendicular to the second wall 2114. The first opening 2113 is smaller than the second opening 2115, and the first opening 2113 is configured to expose an end face, away from the plate-shaped part 2091, of the accommodating part 2092. As shown in FIG. 6, one end, away from the plate-shaped part 2091, of the accommodating part 2092 extends for a certain distance from the first opening 2113, and this distance is the same as the distance between an end face, away from the plate-shaped part 1091, of the accommodating part 1092 of the above connector male head 100 and the first opening 1113 of the metal housing 111. When the connector male head 100 is connected to the connector female head 200, one end, away from the plate-shaped part 2091, of the accommodating part 2092 of the connector female head 200 is inserted into the first opening 1113 of the metal housing 111 of the connector male head 100, meanwhile, each terminal and the anti-crosstalk protrusion 107 of the connector male head 100 are inserted into each connector clip of the connector female head 200. The second opening 2115 is configured to expose an end face, away from the accommodating part, of the plate-shaped part 2091. Through setting the female head accommodating piece 209, each terminal connector clip and the anti-crosstalk protrusion connector lip 208 are stably fixed, and the first opening 2113 of the metal housing 211 allows the metal housing 111 of the connector male head 100 to extend in, such that each terminal of the connector male head 100 and the anti-crosstalk protrusion 107 are in cooperation with each connector clip, respectively.

The connector female head 200 further includes an annular magnet 210. The annular magnet 210 is sleeved outside the accommodating part 2092 of the female head accommodating piece 209 and is accommodated in the metal housing 211. The annular magnet 210 is provided with an annular first surface 2101, an annular second surface 2102 opposite to the first surface 2101, and a first side face 2103 and a second side face 2104 connecting the first surface 2101 and the second surface 2102. The first surface 2101 is attached to a side, close to the accommodating part, of the plate-shaped part 2091. The second surface 2102 is attached to an inner surface of the first wall 2112 of the metal housing 211. The first side face 2103 is attached outside the accommodating part 2092. The second side face 2104 is attached to the inner surface of the second wall 2114 of the metal housing 211. The annular magnet 210 of the connector female head 200 and the annular magnet 110 of the connector male head 100 can be attracted to each other to provide an attraction force, such that the connector female head 200 and the connector male head 100 can in stable cooperation, and loosening does not easily occur, thereby ensuring stable transmission of signals and data. When the connector female head 200 is connected to the connector male head 100, the annular magnet 210 of the connector female head 200 and the annular magnet 110 of the connector male head 100 are opposite and attracted to each other, and the first wall 2112 of the metal housing 211 of the connector female head 200 is abutted against the first wall 1112 of the metal housing 111 of the connector male head 100. Meanwhile, an end wall of the accommodating part 1092 of the connector male head 100 contacts with an end wall of the accommodating part 2082 of the connector female head 200, and each terminal and the anti-crosstalk protrusion of the connector male head 100 are inserted into corresponding connector clip of the connector female head 200 and tight contact is formed. After connection, under the effect of the annular magnet 210 of the connector female head 200 and the annular magnet 110 of the connector male head 100, the connector male head 100 is not easy to shake, and is not easy to be disengaged from the connector female head 200.

The connector female head 200 further includes an anti-collision gasket 212 sleeved outside the accommodating part 2092 of the female head accommodating piece 209. Two side faces of the anti-collision gasket 212 of the connector female head 200 are respectively attached to the first surface 2101 of the annular magnet 210 and the side, close to the accommodating part, of the plate-shaped part 2091 of the female head accommodating piece 209. The anti-collision gasket 212 can prevent collision between the annular magnet 210 of the female head accommodating piece 209 and the plate-shaped part 2091 under the effect of a magnetic force when the connector male head 100 is connected to the connector female head 200, thereby performing anti-collision protection on the plate-shaped part 2091.

The connector female head 200 further includes a circuit board 213. The fixed end of each terminal connector clip is soldered and electrically connected to the circuit board 213, and the fixed end of the anti-crosstalk protrusion connector clip 208 is soldered with the circuit board 214, and grounding is achieved. The metal housing 211 includes a protrusion 2111 connected to the second wall 2114, a through hole 2131 is formed on an edge of the circuit board 213, and the protrusion 2111 extends into the through hole 2131 to fix the metal housing 211 and the circuit board 213. Through such a setting, grounding is formed, and fixed connection between the metal housing 211 and the circuit board 213 is achieved, to form a stable and reliable connection relationship. In the present embodiment, the through hole 2131 of the circuit board 213 is plated with copper, the protrusion 2111 of the metal housing 211 is made of metal, and fixed connection between the protrusion 2111 and the through hole 2131 can achieve grounding of the metal housing 211.

An outer surface of the first wall 2112 of the metal housing 211 is lower than the free end of each connector clip, and when the connector female head 200 is in cooperation with the connector male head 100, each terminal and the anti-crosstalk protrusion 107 of the connector male head 100 are inserted into the jacks 2071, 2072, 2083 of free ends of corresponding connector clips of the connector female head 200 for plug-in fit.

TABLE 4

| | | | | | | | | | | |
|---|---|---|---|---|---|---|---|---|---|---|
| A1 | A2 | A3 | A4 | A5 | A6 | A7 | A8 | A9 | A10 |
| VBUS | TX1+ | TX1− | CC | D+ | D− | SUB1 | RX2− | RX2+ | GND |
| GND | RX1+ | RX1− | SUB2 | D− | D+ | CC2 | TX2− | TX2+ | VBUS |
| B10 | B9 | B8 | B7 | B6 | B5 | B4 | B3 | B2 | B1 |

In another embodiment of the connector female head 200, as shown in Table 4, terminals of the connector female head 200 include VBUS, TX1+, TX1−, CC, D+, D−, SUB1, RX2−, RX2+ and GND which are arranged in sequence. The terminals of the connector female head 200 further include GND, RX1+, RX1−, SUB2, D−, D+, CC2, TX2−, TX2+ and VBUS which are arranged in sequence.

The present disclosure further provides a connector male head 100. As shown in FIG. 1 to FIG. 3, the connector male head 100 includes first transceiving terminals 101 and second transceiving terminals 104 arranged at intervals, the first transceiving terminals 101 include first data terminals 1011 and second data terminals 1012, the second transceiving terminals 104 include first data terminals 2011 and second data terminals 2012, the first data terminals 1011 of the first transceiving terminals 101 and the first data terminals 2011 of the second transceiving terminals 104 are configured to transmit data signals at a first speed, the second data terminals 1012 of the first transceiving terminals 101 and the second data terminals 2012 of the second transceiving terminals 104 are configured to transmit data signals at a second speed, and the first speed is higher than the second speed. The connector male head 100 further includes an anti-crosstalk protrusion 107 located between the first data terminals 1011 of the first transceiving terminals 101 and the first data terminals 2011 of the second transceiving terminals 104, and the anti-crosstalk protrusion 107 is configured to reduce crosstalk between the first data terminals 1011 of the first transceiving terminals 101 and the first data terminals 1041 of the second transceiving terminals 104. The anti-crosstalk protrusion 107 is not located between the second data terminals 1012 of the first transceiving terminals 101 and the second data terminals 2012 of the second transceiving terminals 104.

Optionally, the connector male head 100 further includes first power terminals 102 and second power terminals 105 arranged at intervals, and first signal terminals 103 and second signal terminals 106 arranged at intervals. The first power terminals 102 and the second power terminals 105 are configured to transmit power, and the first signal terminals 103 and the second signal terminals 106 are configured to transmit control signals. The anti-crosstalk protrusion 107 is not located between the first power terminals 102 and the second power terminals 105 and is not located between the first signal terminals 103 and the second signal terminals 106.

Optionally, the first data terminals 1011 of the first transceiving terminals 101 are distant from the first data terminals 1041 of the second transceiving terminals 104 by a first spacing. The first power terminals 102 are distant from the second power terminals 105 by a second spacing. The first signal terminals 103 are distant from the second signal terminals 106 by a third spacing. The second spacing and the third spacing can be basically the same or have a small difference between the two. The first spacing is smaller than the second spacing and the third spacing. The diameter of the first data terminals 1011 of the first transceiving terminals 101 and the first data terminals 1041 of the second transceiving terminals 104 is a first diameter. The diameter of the first power terminals 102 and the first signal terminals is a second diameter. The diameter of the second power terminals 105 and the second signal terminals 106 is a third diameter. The second diameter and the third diameter can be basically the same or have a small difference between the two. The first diameter is smaller than the second diameter and the third diameter.

Optionally, the first transceiving terminals 101 can include a plurality of first data terminals 1011. The second transceiving terminals 104 can include a plurality of first data terminals 1041, and the first data terminals 1011 of the first transceiving terminals 101 are in one-to-one correspondence with the first data terminals 1041 of the second transceiving terminals 104, respectively. The first power terminals 102 and the second power terminals 105 can all be multiple, and the plurality of first power terminals 102 are in one-to-one correspondence with the plurality of second power terminals 105, respectively. The first signal terminals 103 and the second signal terminals can all be multiple, and the plurality of first signal terminals 103 are in one-to-one correspondence with the plurality of second signal terminals 106, respectively.

The present disclosure further provides a connector female head 200. As shown in FIG. 6 to FIG. 8, the connector female head 200 includes first transceiving terminal connector clips 201 and second transceiving terminal connector clips 204 arranged at intervals, the first transceiving terminal connector clips 201 include first data terminal connector clips 2011 and second data terminal connector clips 2012, and the second transceiving terminal connector clips 204 include first data terminal connector clips 2041 and second data terminal connector clips 2042. The connector female head 200 further includes an anti-crosstalk protrusion connector clip 208 located between the first data terminal connector clips 2011 of the first transceiving terminal connector clips 201 and first data terminal connector clips 2041 of the second transceiving terminal connector clips 204. The anti-crosstalk protrusion connector clip 208 is not located between the second data terminal connector clips 2012 of the first transceiving terminal connector clips 201 and the second data terminal connector clips 2042 of the second transceiving terminal connector clips 204. The first transceiving terminal connector clips 201 and the second transceiving terminal connector clips 204 are provided with a first jack 2071, and the anti-crosstalk protrusion connector clip 208 is provided with a jack.

Optionally, the connector female head 200 further includes first power terminal connector clips 202 and second power terminal connector clips 205 arranged at intervals, and first signal terminal connector clips 203 and second signal terminal connector clips 206 arranged at intervals. The first power terminal connector clips 202 and the first signal terminal connector clips 203 are all provided with a second jack 2072. The second power terminal connector clips 205 and the second signal terminal connector clips 206 are all provided with a third jack 2083. The anti-crosstalk protrusion connector clip 208 is not located between the first power terminal connector clips 202 and the second power terminal connector clips 205 and is not located between the first signal terminal connector clips 203 and the second signal terminal connector clips 206.

Optionally, the first data terminal connector clips 2011 of the first transceiving terminal connector clips 201 are distant from the first data terminal connector clips 2041 of the second transceiving terminal connector clips 204 by a first spacing. The first power terminal connector clips 202 are distant from the second power terminal connector clips 205 by a second spacing. The first signal terminal connector clips 203 are distant from the second signal terminal connector clips 206 by a third spacing. The second spacing is equal to the third spacing, and the first spacing is smaller than the second spacing. The diameter of the first jack of the first transceiving terminal connector clips 201 and the second transceiving terminal connector clips 204 is the first diameter. The diameter of the second jack 2072 of the first power terminal connector clips 202 and the first signal terminal connector clips 203 is the second diameter. The diameter of the third jack 2083 of the second power terminal connector clips 205 and the second signal terminal connector clips 206 is the third diameter. The second diameter is equal to the third diameter. The first diameter is smaller than the second diameter.

Optionally, the first transceiving terminal connector clips 201 can include a plurality of first data terminal connector clips 2011. The second transceiving terminal connector clips 204 can include a plurality of first data terminal connector clips 2041, and the first data terminal connector clips 2011 of the first transceiving terminal connector clips 201 are in one-to-one correspondence with the first data terminal connector clips 2041 of the second transceiving terminal connector clips 204, respectively. The first power terminal connector clips 202 and the second power terminal connector clips 205 can all be multiple, and the plurality of first power terminal connector clips 202 are in one-to-one correspondence with the second power terminal connector clips 205, respectively. The first signal terminal connector clips 203 and the second signal terminal connector clips can all be multiple, and the plurality of first signal terminal connector clips 203 are in one-to-one correspondence with the plurality of second signal terminal connector clips 206, respectively.

The present disclosure further provides a connector, including a connector male head and a connector female head, and each terminal of the connector male head is inserted into each terminal connector clip of the connector female head. The connector male head can be any connector male head mentioned in any of the above embodiments, and the connector female head can be any connector female head mentioned in any of the above embodiments.

The above embodiments are merely exemplary embodiments of the present disclosure, and are not used to limit the present disclosure. The protection scope of the present disclosure is defined by the claims. Various modifications or equivalent substitutions made to the present disclosure by those skilled in the art within the spirit and protection scope of the present disclosure also fall within the protection scope of the present disclosure.

What is claimed is:

1. A connector male head, comprising:

terminals, the terminals comprising:

a plurality of first transceiving terminals comprising a plurality of first data terminals arranged in a first column;

a plurality of second transceiving terminals comprising a plurality of first data terminals arranged in a second column, wherein the first column is parallel to the second column, and the first data terminals of the first transceiving terminals are in one-to-one correspondence with the first data terminals of the second transceiving terminals, respectively;

a plurality of first power terminals and a plurality of first signal terminals, wherein the first power terminals are configured to transmit power, and the first signal terminals are configured to transmit control signals; and a plurality of second power terminals and a plurality of second signal terminals, wherein the second power terminals are configured to transmit power, and the second signal terminals are configured to transmit control signals; and an anti-crosstalk protrusion located between the first data terminals of the first transceiving terminals and the first data terminals of the second transceiving terminals, configured to reduce crosstalk between the first data terminals of the first transceiving terminals and the first data terminals of the second transceiving terminals, and not located between the first power terminals and the second power terminals and not located between the first signal terminals and the second signal terminals.

2. The connector male head according to claim 1, wherein the first power terminals and the first signal terminals are commonly arranged in a third column, the third column is parallel to the first column, the second power terminals and the second signal terminals are commonly arranged in a fourth column, the fourth column is parallel to the second column, the second power terminals are in one-to-one correspondence with the first power terminals, respectively, the second signal terminals are in one-to-one correspondence with the first signal terminals, respectively, and a spacing between the first column and the second column is greater than a spacing between the third column and the fourth column.

3. The connector male head according to claim 1, wherein the anti-crosstalk protrusion is a plate-shaped metal protrusion, a spacing between two ends of the anti-crosstalk protrusion along a direction of the first column is greater than a spacing between two ends of the first data terminals, opposite to the anti-crosstalk protrusion, along the direction of the first column; and a free end of the anti-crosstalk protrusion is higher than free ends of the first data terminals along a direction from respective fixed ends to free ends of the first data terminals.

4. The connector male head according to claim 2, wherein the connector male head is of a Type-C type, the first data terminals are configured to transmit data signals at a first speed, both the first transceiving terminals and the second transceiving terminals further comprise a plurality of second data terminals configured to transmit data signals at a second speed, the first speed is higher than the second speed, the second data terminals of the first transceiving terminals are arranged in the third column, the second data terminals of the second transceiving terminals are arranged in the fourth column, the second data terminals of the first transceiving terminals correspond to the second data terminals of the second transceiving terminals, and the anti-crosstalk protrusion is not located between the second data terminals of the first transceiving terminals and the second data terminals of the second transceiving terminals.

5. The connector male head according to claim 2, wherein the first column comprises a first segment and a second segment arranged at two sides of the third column, respectively, in the third column, the second data terminals are located in a middle position, and the first signal terminals and the first power terminals are arranged in sequence in a direction from the middle position to two ends; and the second column comprises a first segment and a second segment arranged at two sides of the fourth column, respectively, in the fourth column, the second data terminals are located in a middle position, and the second signal terminals and the second power terminals are arranged in sequence in a direction from the middle position to two ends.

6. The connector male head according to claim 1, wherein diameters of the first data terminals are smaller than diameters of the first power terminals, the first signal terminals, the second power terminals and the second signal terminals.

7. The connector male head according to a claim 1, further comprising:

a male head accommodating piece comprising a plate-shaped part and an accommodating part fixedly connected to a side of the plate-shaped part, wherein the male head accommodating piece is provided with a plurality of holes penetrating through the plate-shaped part and the accommodating part, each terminal and the anti-crosstalk protrusion penetrate into the holes and are fixed, free ends of respective terminals extend out of the holes and are close to the accommodating part, fixed ends of respective terminals extends out of the holes and is close to the plate-shaped part, and the free ends of respective terminals and the anti-crosstalk protrusion are configured to cooperate with a connector female head; and a metal housing comprising a first wall configured to define a first opening and a second wall configured to define a second opening, wherein the first wall is perpendicular to the second wall, the first opening is smaller than the second opening, the first opening is configured to expose an end face, away from the plate-shaped part, of the accommodating part, and the second opening is configured to expose an end face, away from the accommodating part, of the plate-shaped part.

8. The connector male head according to claim 7, further comprising: an annular magnet, wherein the annular magnet is sleeved outside the accommodating part of the male head accommodating piece and is accommodated in the metal housing, the annular magnet is provided with an annular first surface, an annular second surface opposite to the first surface, and a first side face and a second side face which connect the first surface and the second surface, the first surface is attached to a side, close to the accommodating part, of the plate-shaped part, the second surface is attached to an inner surface of the first wall of the metal housing, the first side face is attached outside the accommodating part, and the second side face is attached to an inner surface of the second wall of the metal housing.

9. The connector male head according to claim 8, further comprising an anti-collision gasket sleeved outside the accommodating part of the male head accommodating piece, wherein two side faces of the anti-collision gasket are respectively attached to the first surface of the annular magnet and a side, close to the accommodating part, of the plate-shaped part of the male head accommodating piece.

10. The connector male head according to claim 7, further comprising a circuit board for soldering with a cable of a data cable, wherein the fixed ends of respective terminals and the anti-crosstalk protrusion are soldered with the circuit board; the metal housing comprises a protrusion connected to the second wall, a through hole is formed on an edge of the circuit board, the protrusion extends into the through hole and is configured to fix the metal housing and the circuit board; the connector male head further comprises an injection molded housing, the injection molded housing wraps the circuit board and part of the metal housing, and the first wall and part of the second wall of the metal housing are exposed out of the injection molded housing.

11. The connector male head according to claim 7, wherein an outer surface of the first wall of the metal housing is higher than each terminal and the free end of the anti-crosstalk protrusion in a direction from the fixed end to the free end of each terminal.

12. A connector female head, comprising:

a plurality of first transceiving terminal connector clips comprising a plurality of first data terminal connector clips arranged in a first column, wherein each of the first data terminal connector clips is provided with a first jack;

a plurality of second transceiving terminal connector clips comprising a plurality of first data terminal connector clips arranged in a second column, wherein the first column is parallel to the second column, each of the first data terminal connector clips is provided with a first jack, and the plurality of first data terminal connector clips of the plurality of first transceiving terminal connector clips are in one-to-one correspondence with the first data terminal connector clips of the plurality of second transceiving terminal connector clips, respectively;

a plurality of first power terminal connector clips and a plurality of first signal terminal connector clips, wherein the first power terminal connector clips are configured to transmit power, the first signal terminal connector clips are configured to transmit control signals, and the first power terminal connector clips and the first signal terminal connector clips are all provided with a second jack;

a plurality of second power terminal connector clips and a plurality of second signal terminal connector clips, wherein the second power terminal connector clips are configured to transmit power, the second signal terminal connector clips are configured to transmit control signals, and the second power terminal connector clips and the second signal terminal connector clips are all provided with a third jack; and an anti-crosstalk protrusion connector clip located between the first data terminal connector clips of the first transceiving terminal connector clips and the first data terminal connector clips of the second transceiving terminal connector clips, wherein the anti-crosstalk protrusion connector clip is provided with a jack, and the anti-crosstalk protrusion connector clip is not located between the first power terminal connector clips and the second power terminal connector clips and is not located between the first signal terminal connector clips and the second signal terminal connector clips.

13. The connector female head according to claim 12, wherein the anti-crosstalk protrusion connector clip is made of metal materials, the jack of the anti-crosstalk protrusion connector clip is plate-shaped, the spacing between two ends of the anti-crosstalk protrusion connector clip along the direction of the first column is greater than the spacing between two ends of the first data terminal connector clips, opposite to the anti-crosstalk protrusion connector clip, along the direction of the first column; and a free end of the anti-crosstalk protrusion connector clip is higher than free ends of the first data terminal connector clips along a direction from fixed ends to free ends of the first data terminal connector clips.

14. The connector female head according to claim 12, wherein the anti-crosstalk protrusion connector clip comprises two clamping pieces arranged opposite to each other and a connecting part connecting opposite ends of the two clamping pieces, the two clamping pieces and the connecting part are integrated into a "U" shape, the spacing between respective ends, away from the connecting part, of the two clamping pieces is smaller than the spacing between the two clamping pieces and respective ends connected by the connecting part, one end, away from the connecting part, of each of the clamping pieces bends towards the direction away from the other clamping piece to form a guiding piece, and a guiding included angle less than 180° is formed between two guiding pieces.

15. A connector, comprising a connector male head and a connector female head, wherein each terminal of the connector male head is inserted into each terminal connector clip of the connector female head, the connector male head comprises:

terminals, the terminals comprising:

a plurality of first transceiving terminals comprising a plurality of first data terminals arranged in a first column, a plurality of second transceiving terminals comprising a plurality of first data terminals arranged in a second column, wherein the first column is parallel to the second column, and the first data terminals of the first transceiving terminals are in one-to-one correspondence with the first data terminals of the second transceiving terminals, respectively, a plurality of first power terminals and a plurality of first signal terminals, wherein the first power terminals are configured to transmit power, and the first signal terminals are configured to transmit control signals; and a plurality of second power terminals and a plurality of second signal terminals, wherein the second power terminals are configured to transmit power, and the second signal terminals are configured to transmit control signals; and an anti-crosstalk protrusion located between the first data terminals of the first transceiving terminals and the data terminals of the second transceiving terminals, configured to reduce cross talk between the first data terminals of the first transceiving terminals and the first data terminals of the second transceiving terminals and not located between the first power terminals and the second power terminals and not located between the first signal terminals and the second signal terminals, and the connector female head comprises:

a plurality of the first transceiving terminal connector clips comprising a plurality of first data terminal connector chips arranged in a first column, wherein each of the first data terminal connector clips in provided with a first jack, a plurality of second transceiving terminal connector clips comprising a plurality of first data terminal connector clips arranged in a second column, wherein the first column is parallel to the second column, each of the first data terminal connector clips is provided with a first jack, and the plurality of first data terminal connector clips of the plurality of first transceiving terminal connector clips are in one-to-one correspondence with the first data terminal connector clips of the plurality of second transceiving terminal connector clips, respectively;

a plurality of first power terminal connector clips and a plurality of first signal terminal connector clips, wherein the first power terminal connector clips are configured to transmit power, the first signal terminal connector clips are configured to transmit control signals, and the first power terminal connector clips and the first signal terminal connector clips are all provided with a second jack, a plurality of second power terminal connector clips and a plurality of second signal terminal connector clips, wherein the second power terminal connector clips are configured to transmit power, the second signal terminal connector clips are configured to transmit control signals, and the second power terminal connector clips, and the second signal terminal connector clips are all provided with a third jack; and an anti-crosswalk protrusion connector clip located between the first data terminal connector clips of the first transceiving terminal connector clips, wherein the terminal connector clips of the second transceiving terminal connector clips, wherein the anti-crosstalk protrusion connector clip is provided with a jack, and the anti-crosstalk protrusion connector clips is not located between the first power terminal connector clips and the second power terminal connector clips and is not located between the first signal terminal connector clips and the second signal terminal connector clips.

16. The connector male head according to claim 1, wherein each of the terminals comprises a barrel-shaped piece and a pop-up piece.

17. The connector male head according to claim 1, further comprising:

a male head accommodating piece comprising a plate-shaped part and an accommodating part fixedly connected to a side of the plate-shaped part, wherein sizes by which free ends of the first data terminals protrude from the accommodating part range from 0.4 mm to 0.45 mm.

18. The connector male head according to claim 1, further comprising:

a male head accommodating piece comprising a plate-shaped part and an accommodating part fixedly connected to a side of the plate-shaped part, wherein sizes by which free ends of the first power terminals, the first signal terminals, the second power terminals and the second signal terminals protrude from the accommodating part range from 0.52 mm to 0.58 mm.

19. The connector male head according to claim 1, further comprising:

a male head accommodating piece comprising a plate-shaped part and an accommodating part fixedly connected to a side of the plate-shaped part, wherein a size of the anti-crosstalk protrusion in a direction perpendicular to the first column ranges from 0.18 mm to 0.22 mm, a size by which a free end of the anti-crosstalk protrusion protrudes from the accommodating part ranges from 0.65 mm-0.75 mm, and in the direction perpendicular to the first column, a distance from a side face, facing towards the first data terminals, of the anti-crosstalk protrusion to the first data terminals towards which the anti-crosstalk protrusion faces ranges from 0.95 mm to 1.05 mm.

20. The connector male head according to claim 6, wherein the diameters of the first data terminals range from 0.22 mm to 0.26 mm, and the diameters of the first power terminals, the first signal terminals, the second power terminals and the second signal terminals range from 0.32 mm to 0.36 mm.

* * * * *